No. 734,649. Patented July 28, 1903.

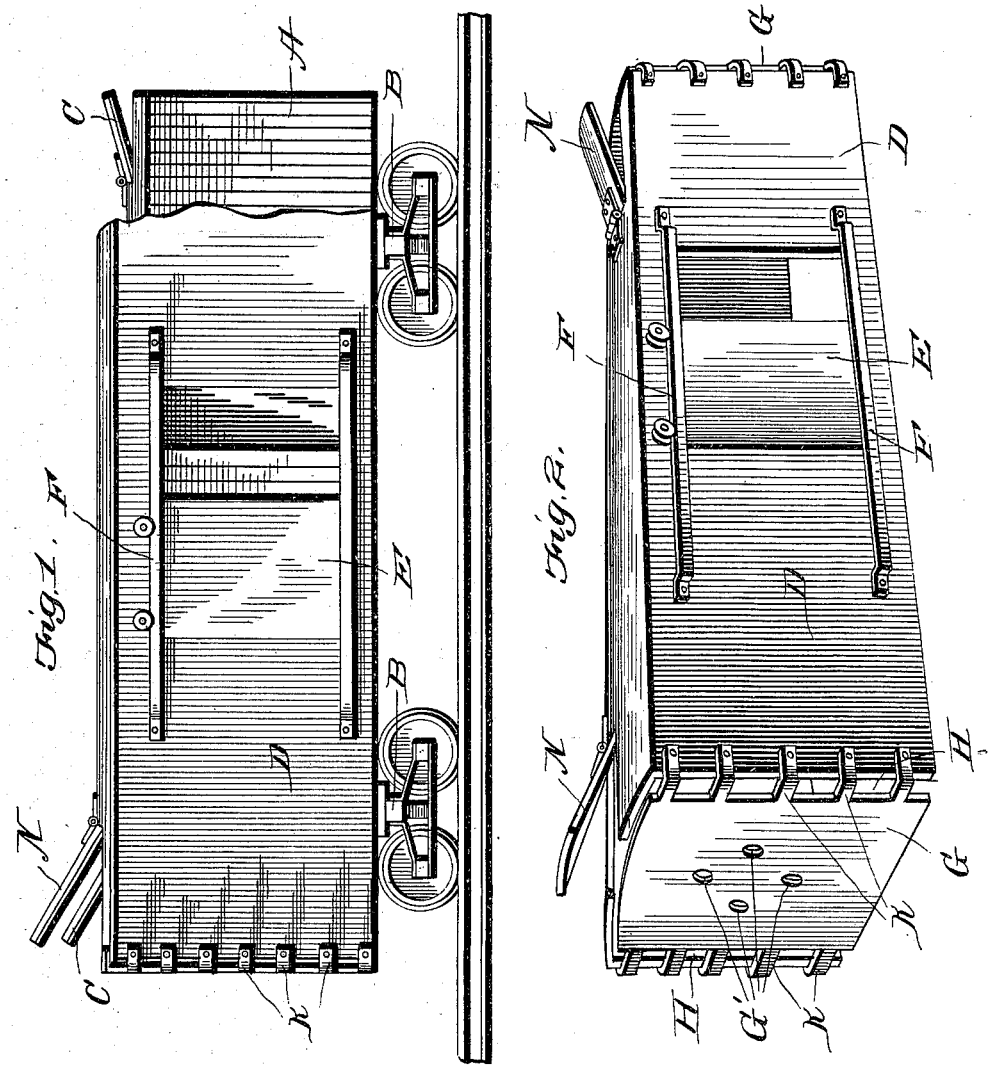

UNITED STATES PATENT OFFICE.

CASPER ZIMMERMAN, OF CHICAGO, ILLINOIS, ASSIGNOR OF ONE-HALF TO CHARLES ANDERSON AND J. M. KNADLE, OF VIENNA, SOUTH DAKOTA.

REFRIGERATOR-CAR.

SPECIFICATION forming part of Letters Patent No. 734,649, dated July 28, 1903.

Application filed April 3, 1903. Serial No. 150,981. (No model.)

*To all whom it may concern:*

Be it known that I, CASPER ZIMMERMAN, a citizen of the United States, residing at Chicago, in the county of Cook and State of Illinois, have invented certain new and useful Improvements in Refrigerator-Cars; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in refrigerator-cars, and especially in the provision of a shell or outer covering for a refrigerator-car so arranged that a current of air may be allowed to pass intermediate the shell and the outer surface of the car to protect the contents of the car from the direct rays of the sun and allow the circulation of air to prevent undue melting of ice, suitable means being provided in the covering to allow access to be had to the contents of the car.

The invention consists in various details of construction and combinations of parts, which will be hereinafter fully described and then specifically defined in the appended claim.

My invention is illustrated in the accompanying drawings, in which—

Figure 1 is a side elevation of my improved car, a portion of one end of the protecting-casing being broken away, disclosing the end of the car proper. Fig. 2 is a perspective view of the outside or the protective shell.

Reference now being had to the details of the drawings by letter, A designates a refrigerator-car, which may be of the usual construction, mounted upon a truck B and having hinged doors C, one at each end thereof, in the roof of the car and adapted to open in the manner disclosed in the drawings. The protective shell or casing of the car comprises the body portion D, having a doorway cut therein, and a sliding door E, mounted upon the tracks F, and G designates the ends of the protective shell or covering, which are of a width slightly less than the width of the shell, allowing a space H to intervene beyond the edges of the ends and the side walls and the top or roof of the car, whereby air may circulate over the roof of the car and between the sides of the shell and the sides of the car to assist in keeping the contents of the car cool. The ends of the protective shell or casing are supported upon the sides of the car by means of the arms K and spaced apart and bolted or otherwise fastened to the body portion thereof, and apertures G' are formed in the ends of the car to allow for the ready passage of air through the same as the car is in motion. The roof of the protective shell or covering is provided with hinged doors N, which swing rearward and are mounted directly over the doors C, whereby access may be readily had through the two sets of doors without removing the shell or protective covering.

When the protective shell is placed over a car, a slight space intervenes between the inner face thereof and the sides and the roof of a car sufficient to allow a good circulation of air from end to end, thus preventing the rays of the sun from direct contact with the sides or roof of the car and producing a refrigerator apparatus which will render practical a means for conveying perishable goods over arid plains and in hot climates, where ice and cooling means are a great desideratum.

While I have shown a particular construction of refrigerator-car, it will be understood that I may make changes in the detailed construction of the same without departing from the spirit of the invention.

Having thus fully described my invention, what I claim as new, and desire to secure by Letters Patent, is—

A protective covering for refrigerator-cars consisting of a shell designed to be fitted over the body of a car with a space intervening between the sides and the top of the car and said shell, the ends of the shell having angled arms which project from the opposite edges thereof and secured to opposite sides of the shell, with spaces intermediate said arms allowing air to circulate through the shell, the top of each end section of the shell being spaced apart from the roof of the shell, and a hinged cover to said roof, substantially as shown and described.

In testimony whereof I hereunto affix my signature in presence of two witnesses.

CASPER ZIMMERMAN.

Witnesses:
A. L. HOUGH,
FRANKLIN H. HOUGH.